United States Patent [19]
Larsen

[11] Patent Number: 5,645,870
[45] Date of Patent: Jul. 8, 1997

[54] BLOW MOLDING APPARATUS HAVING A CYLINDRICAL HUB

[75] Inventor: W. Bruce Larsen, Holland, Ohio

[73] Assignee: Owens-Brockway Plastic Products Inc., Toledo, Ohio

[21] Appl. No.: 510,227

[22] Filed: Aug. 2, 1995

[51] Int. Cl.[6] .......................... B29C 49/36; B29C 49/64
[52] U.S. Cl. .................. 425/182; 264/543; 425/451; 425/453; 425/526; 425/540
[58] Field of Search ....................... 425/540, 526, 425/182, 451, 453, 454; 264/543

[56] References Cited

U.S. PATENT DOCUMENTS

| | | | |
|---|---|---|---|
| 2,383,556 | 8/1945 | Louden et al. | 425/451 |
| 2,579,399 | 12/1951 | Ruekberg | 264/543 |
| 2,750,625 | 6/1956 | Colombo | 425/536 |
| 2,784,452 | 3/1957 | Ruekberg | 425/451 |
| 3,025,561 | 3/1962 | Ruekberg et al. | 425/540 |
| 3,310,834 | 3/1967 | Simpson et al. | 425/152 |
| 3,541,645 | 11/1970 | Bunting | 425/453 |
| 3,767,345 | 10/1973 | Doughty et al. | 425/540 |
| 3,785,761 | 1/1974 | Logomasini et al. | 425/540 |
| 3,941,863 | 3/1976 | Pollock et al. | 264/334 |
| 4,060,364 | 11/1977 | Gras | 425/453 |
| 4,213,750 | 7/1980 | Kubota et al. | 425/540 |
| 4,370,124 | 1/1983 | Buja | 425/556 |
| 4,549,865 | 10/1985 | Myers | 425/540 |
| 4,565,516 | 1/1986 | Szajna et al. | 425/540 |
| 4,650,412 | 3/1987 | Windstrup et al. | 425/540 |
| 4,698,012 | 10/1987 | Shelby et al. | 425/526 |
| 5,039,298 | 8/1991 | Takakusaki et al. | 425/504 |
| 5,240,718 | 8/1993 | Young et al. | 425/540 |

FOREIGN PATENT DOCUMENTS

| | | | |
|---|---|---|---|
| 2253234 | 5/1973 | Germany | 264/543 |

Primary Examiner—Robert Davis

[57] ABSTRACT

A rotary plastic blow mold machine including a cylindrical hub rotatably mounted about an axis. A plurality of mold assemblies including an upper mold and a lower mold movable axially toward one another are removably mounted on the machine with each lower mold on the periphery of the hub. Mounting construction is interposed between the lower mold and the hub. Each mounting arrangement has an arcuate surface engaging a portion of the periphery of the cylindrical hub such that the lower mold can be removed and replaced on the hub by different size molds.

4 Claims, 5 Drawing Sheets

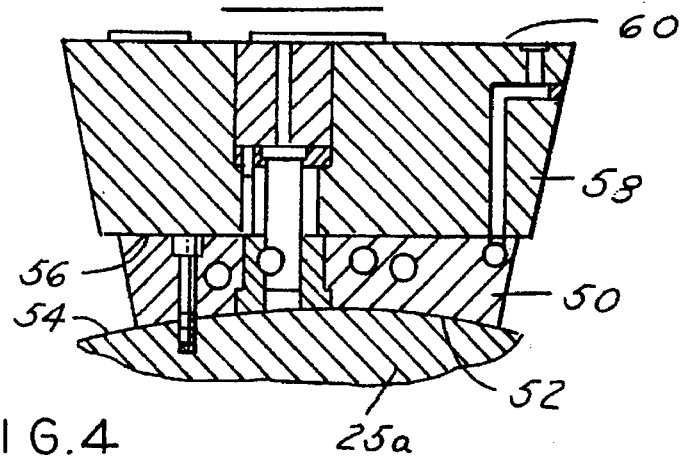
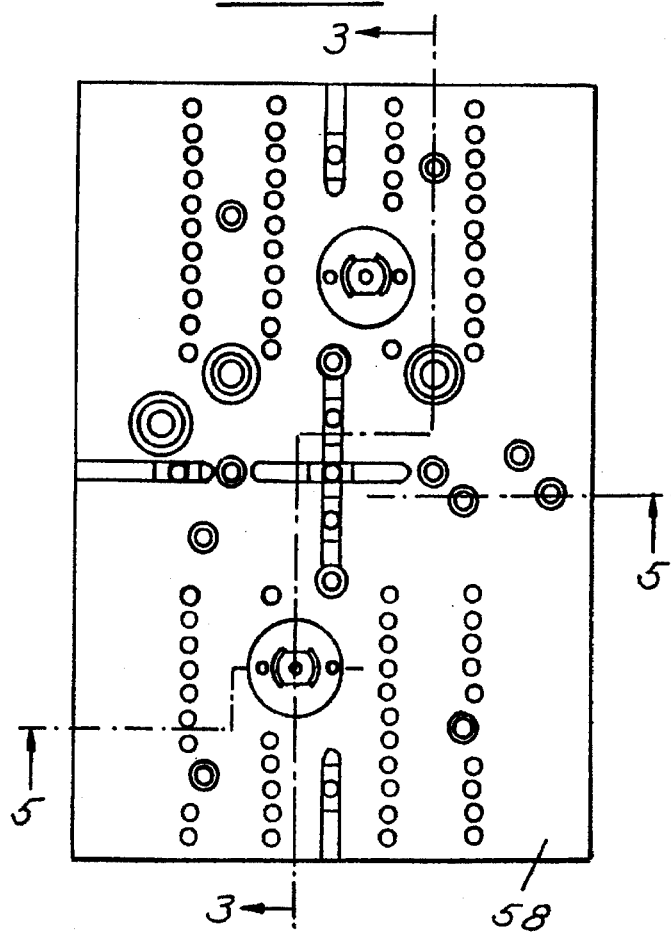
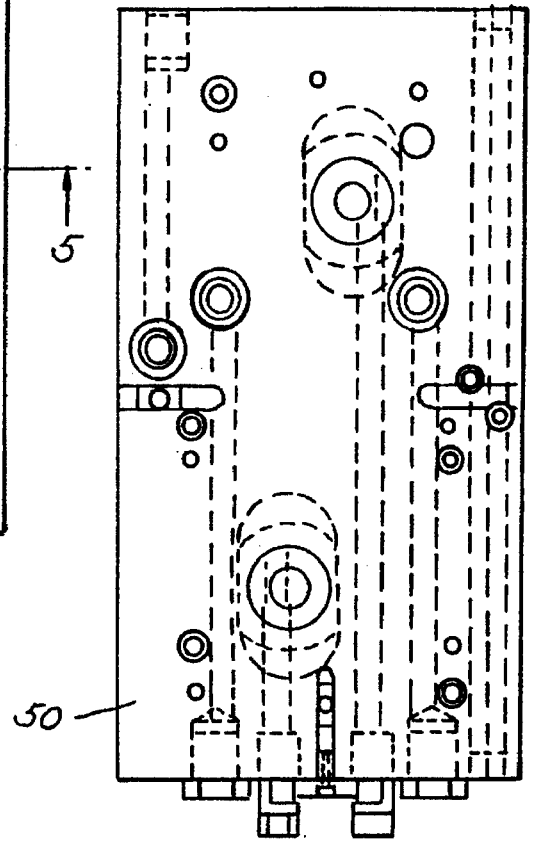

BLOW MOLDING APPARATUS HAVING A CYLINDRICAL HUB

This invention relates to blow molding apparatus.

BACKGROUND AND SUMMARY OF THE INVENTION

In blow molding machines of the wheel type, a wheel supports a plurality of circumferentially spaced sets of molds and is generally rotated about a horizontal axis. Plastic tubing is continuously extruded downwardly between the open mold sections and then the molds are closed as they move about an annular path and the portion of the tubing within the molds is blown within the confines of the mold to provide a hollow article which may be a container.

In the blow molding machine shown and described in U.S. Pat. No. 4,549,865, incorporated herein by reference, the blow molding apparatus comprises a wheel plate, a shaft extending horizontal and supporting the wheel plate for rotation and a hub removably mounted on the shaft for rotation with the shaft, and a plurality of sets of molds defining a mold cavity when closed, each set comprising a pair of mold sections, a first mold section of each set being mounted on the hub such that the mold sections are circumferentially spaced about the hub, a second mold section of each set being mounted on the wheel in circumferentially spaced relation and radial alignment with the first mentioned mold section. The second mold sections are mounted on slide assemblies for movement toward and away from the first mold sections. The hub has circumferentially spaced external surfaces for supporting the first mold sections, the number of surfaces corresponding to the number of first mold sections. The hub may be removed and a second hub replaced on the shaft, having a plurality of circumferentially spaced surfaces, the number of the surfaces of the second hub differing from the number of surfaces on the first hub. The wheel plate accommodates a different number of slide assemblies to correspond with the different number of mold surfaces on the second hub.

Such apparatus has been proven to be commercially successful. However, the use of the polygonal hub, having a predetermined number of mold mounting surfaces, limits the number of mold assemblies and the size of the mold assemblies such that the hub must be removed and replaced when substantially different mold assemblies either in number or size are to be used.

Among the objectives of the present invention are to provide a blow molding machine wherein the process of changing the number of mold assemblies is facilitated by not requiring a change in the hub.

In accordance with the invention, a blow mold mounting apparatus are provided for the mold assemblies which provide for a quick changing of the number of molds and size of the molds. More specifically, the mounting arrangements comprise a flat upper surface for supporting the mold assemblies and a cylindrical lower surface that conforms with the shaft of the blow molding machine.

DESCRIPTION OF THE DRAWINGS

FIG. 4 is a sectional view taken along the line 4—4 in FIG. 3.

FIG. 5 is a fragmentary sectional view taken along the line 5—5 in FIG. 4.

FIG. 6 is a sectional view taken along the line 6—6 in FIG. 2.

DESCRIPTION OF THE PREFERRED EMBODIMENT

Figure 1:
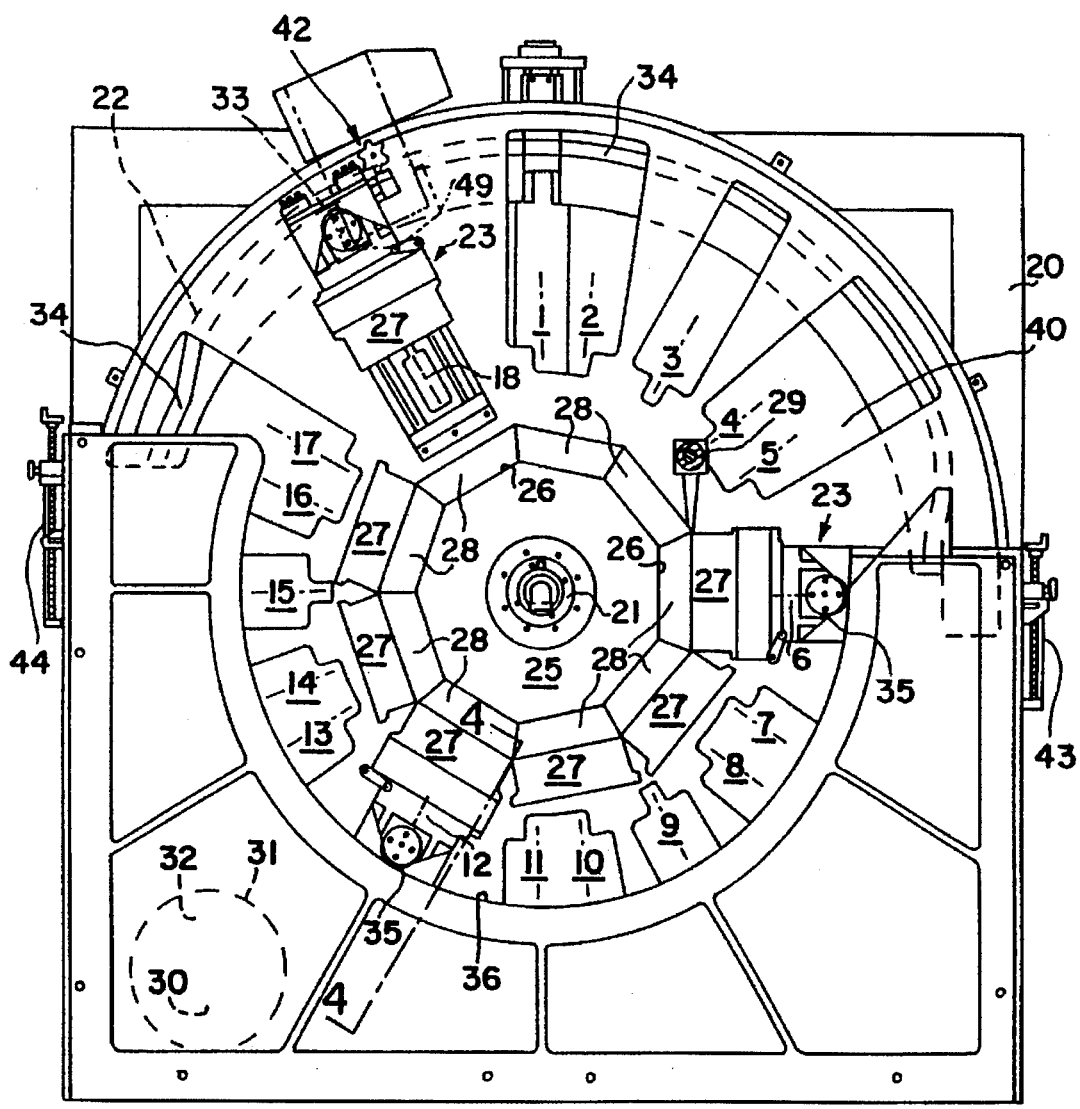
FIG. 1 is an elevational view of a prior art blow molding apparatus.
Figure 2:
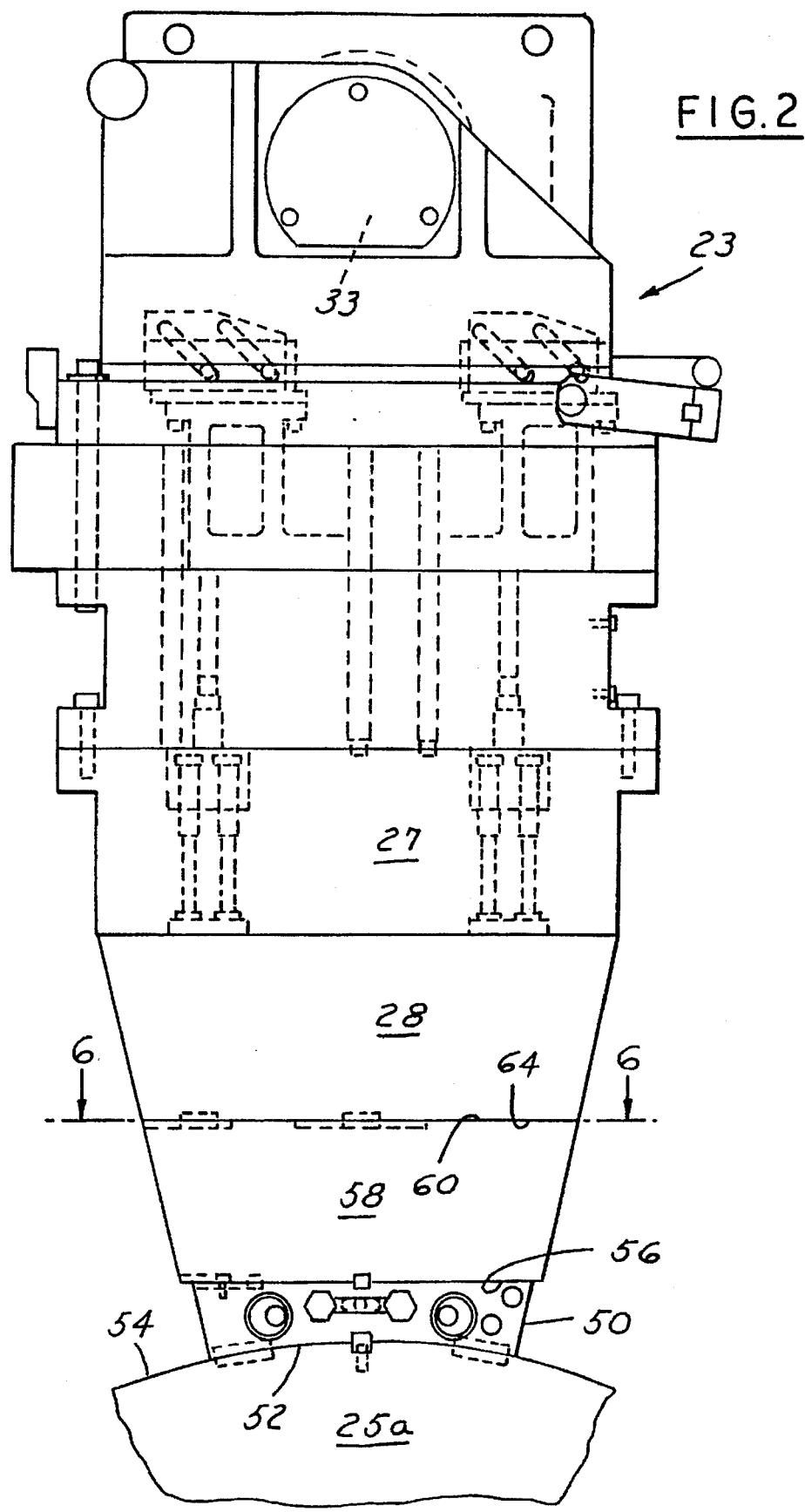
FIG. 2 is a fragmentary elevational view of the blow molding apparatus embodying the invention.
Figure 3:
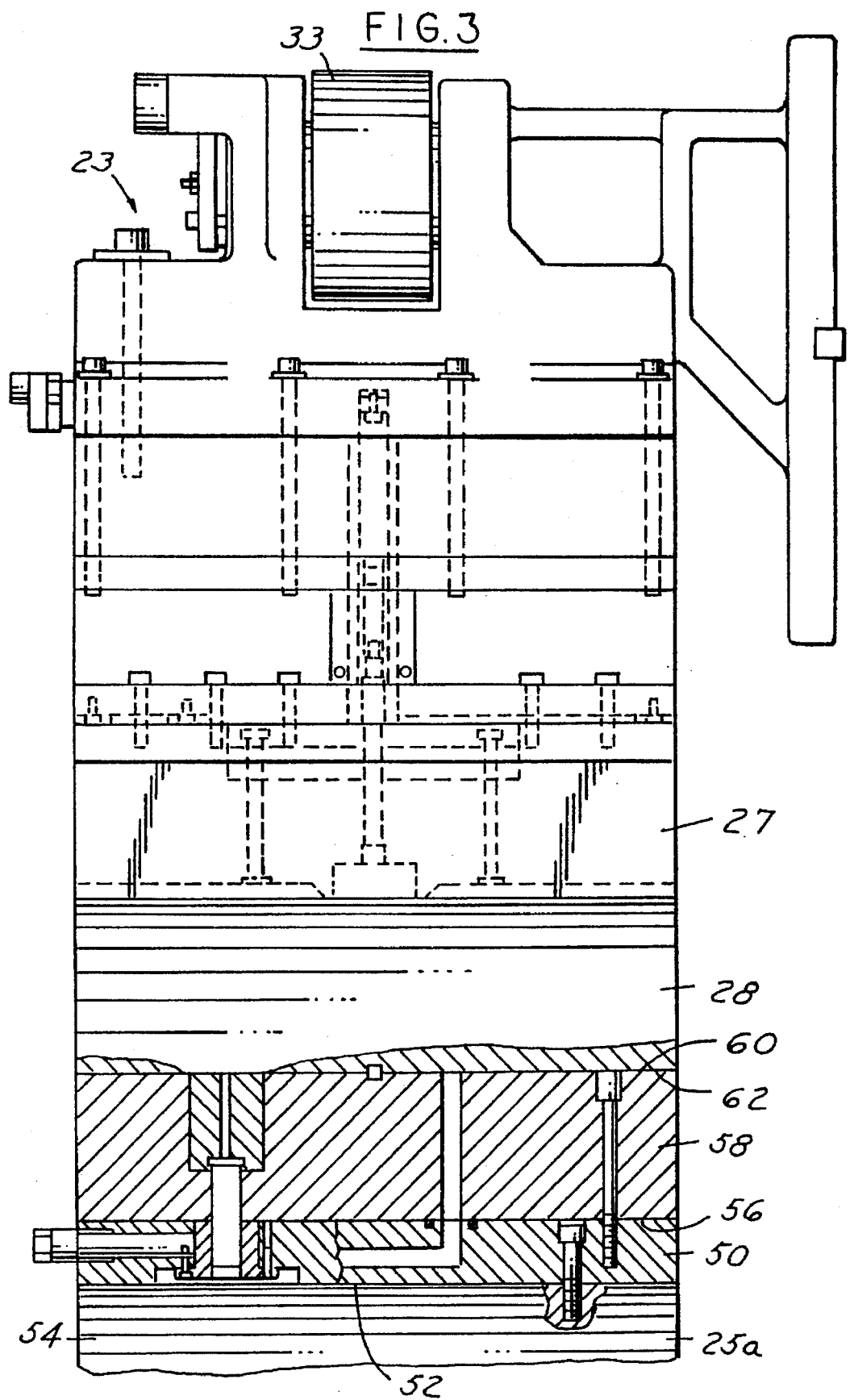
FIG. 3 is a side elevational view of the apparatus shown in FIG. 2.

The blow molding apparatus of the present invention is substantially like that of aforementioned U.S. Pat. No. 4,549,865, incorporated herein by reference and shown in FIG. 1. However, instead of having the polygonal hub 25 being cylindrical, that is, it has an outer cylindrical surface.

Thus, the apparatus has the blow molding apparatus embodying the invention comprises a frame 20 in which a shaft 21 is mounted for rotation about a horizontal axis by spaced bearings in cantilever fashion. A wheel plate 22 is mounted on the shaft 21 and supports a plurality of circumferentially spaced slide assemblies 23. A hub 25 is also mounted on the shaft and has a plurality of circumferentially spaced mold supporting surfaces 26 corresponding in number to the number of slide assemblies 23.

Each slide assembly 23 comprises mold section mounting means for supporting a section or part 27 of mold and the corresponding surface 26 of the hub 25 supports the second section 28 of a mold. Each slide assembly 23 is adapted to move the mold section 27 toward and away from the other mold section 28 to close about a plasticized parison emanating from an extruder head 29 so that the parison can be blown to the shape of the mold cavity defined by the mold sections 27, 28 as the wheel rotates. The parison is provided from the head 29 of an extruder in the two o'clock position as shown in FIG. 1.

Wheel plate 22 is rotated by a gear 30 driven by a motor 31 and meshing with a gear 32 on the periphery of the wheel plate. Each slide assembly 23 includes a cam follower 33 which engages a fixed arcuate cam 34 on the frame 20 to move mold section 27 toward and away from mold section 28. A second cam follower 35 on each slide assembly 23 engages a second fixed cam 36 on frame 20 to hold the mold sections 27, 28 in closed and clamped position. Second cam 36 extends generally from the three o'clock position to just beyond the nine o'clock position as viewed in FIG. 1.

In accordance with the invention as shown in FIGS. 2–8, each mounting arrangement for the lower molds 28 includes a hub 25a having a cylindrical outer surface. As shown, a water manifold 50 is provided adjacent the hub 25a and has a lower curved cylindrical surface 52 that engages the cylindrical surface 54 of hub 25a. Manifold 50 includes a flat upper surface 56 which engages a flat lower surface 60 of a spacer 58 which in turn has a flat upper surface 62 that engages and supports the lower flat surface 64 of the lower mold 28. The manifold 50 and spacer 58 have communicating coolant passages for receiving coolant such as water from the hub 25a and circulating it to and from the lower mold 28.

As a result of this arrangement, the cylindrical hub 25a is not limited to a predetermined number of mold mounting surfaces as is the case of a polygonal hub 25. Moreover, the cylindrical hubs 25a need not be changed to change the number and size of the molds.

Figure 7:
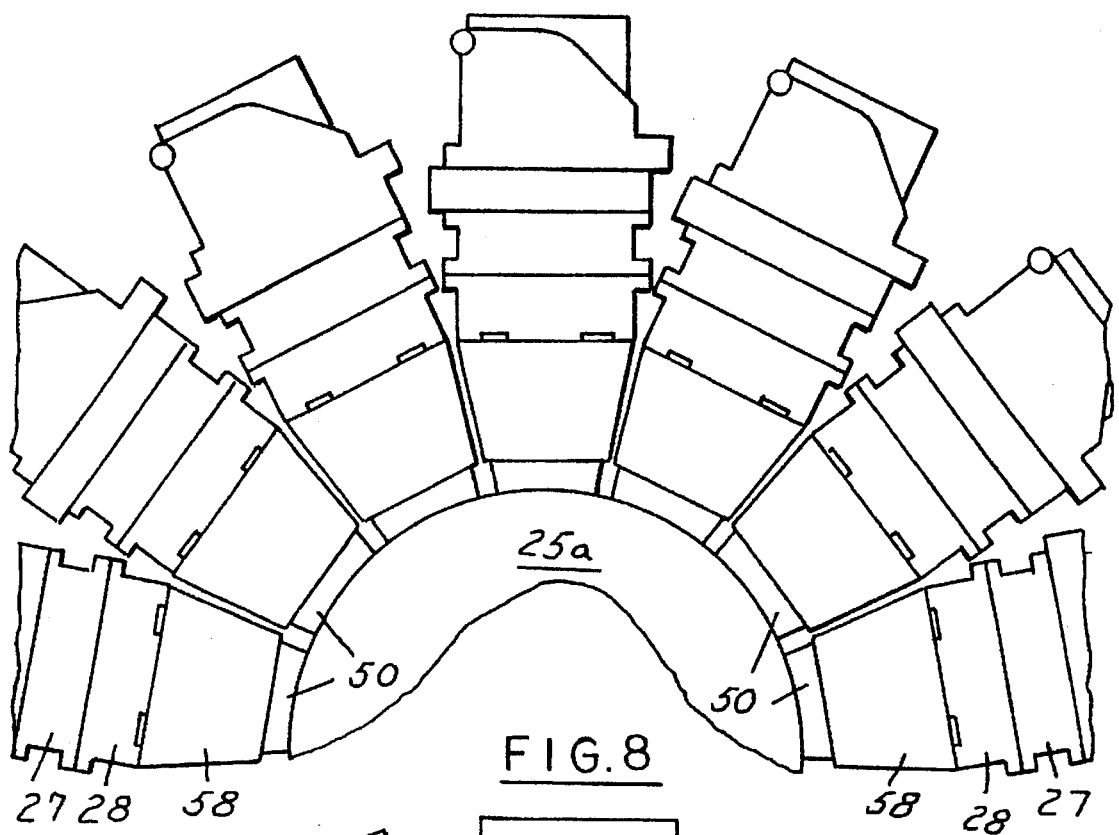
FIG. 7 is a diagrammatic representation showing smaller molds being provided in the apparatus.
Figure 8:
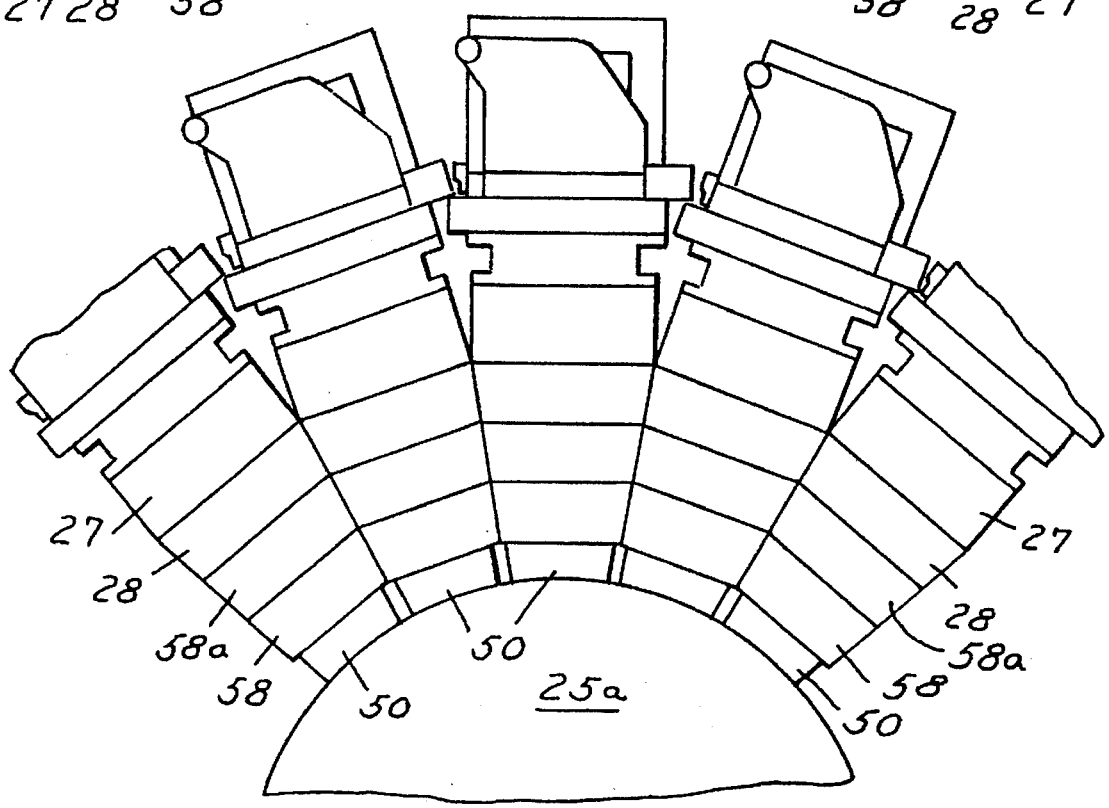
FIG. 8 is a similar representation showing larger molds mounted in the apparatus.

As shown in FIG. 7, smaller molds are provided. Upon removal, they can be replaced by larger molds in which cases an added spacer 58a may be needed, but the hub 25a remains the same.

I claim:

1. A blow molding apparatus comprising a frame, a wheel plate, a shaft rotatably mounted on said frame and extending horizontally, means for supporting said wheel plate on said shaft for rotation with said shaft, a first hub mounted said shaft for rotation with said shaft, a plurality of sets of molds defining a mold cavity when closed, each said set comprising a pair of mold sections, said first hub having a cylindrical surface having an axis aligned with the axis of said shaft, one mold section of each said set having an arcuate surface engaging and being mounted on said cylindrical surface of said first hub such that said mold sections are circumferentially spaced about said first hub, a plurality of mold section slide assemblies removably mounting a second mold section of each said set on said wheel plate in circumferentially spaced relation and radial alignment with each said one mold section and for movement radially toward and away from said one mold section, the number of mold section slide assemblies corresponding to the number of set of molds, such that the number of mold section slide assemblies can be changed by adding or removing mold section slide assemblies.

2. The blow molding apparatus set forth in claim 1 wherein each said mold section slide assembly includes a cam follower associated with its respective mold section, an arcuate cam mounted on said frame engaging each said cam follower and moving its respective mold section toward and away from its respective mold sections on the hubs as the wheel plate is rotated with respect to the cam.

3. The blow molding apparatus set forth in claim 2 wherein said means on said wheel plate for accommodating said mold section slide assemblies are circumferentially positioned to accommodate six, nine, and twelve slide assemblies in respective equally spaced relation to one another.

4. The rotary plastic blow molding machine set forth in claim 2 including a plurality of spacers having contacting flat surfaces interposed between each said manifold and said lower mold.

* * * * *